United States Patent Office 3,169,091
Patented Feb. 9, 1965

3,169,091
PROCESS FOR INHIBITING TUMORS WITH SUBSTITUTED PYRAZOLES
Philip N. Gordon, Old Lyme, Conn., assignor to Chas. Pfizer & Co., Inc., New York, N.Y., a corporation of Delaware
No Drawing. Filed Jan. 4, 1961, Ser. No. 80,520
1 Claim. (Cl. 167—65)

This invention relates to a method for inhibiting the growth of tumors and to a composition useful in such treatment. More specifically, it relates to a method for inhibiting malignant tumor growth in animals.

Although the field of cancer therapy has been the subject of intensive study, particularly in recent years, relatively few effective substances have been found which will inhibit or retard the growth of malignant tumors. Any extension of the range of available agents therefore represents a significant contribution to the knowledge of this important subject.

It has now been discovered that pyrazole and certain of its derivatives possess significant activity against tumors and particularly against mammary adenocarcinoma CA–755. The valuable compounds have the general formulae

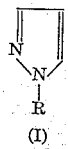

(I)

and

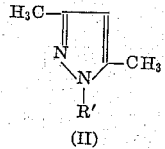

(II)

wherein R is selected from the group consisting of hydrogen, hydroxymethyl, carboxamido and thiocarboxamido; R' is selected from the group consisting of carboxamido and thiocarboxamido. The compounds are known and are prepared by methods well known in the art.

These compounds, as mentioned above, exhibit significant anti-tumor activity against mammary adenocarcinoma CA–755 when tested according to the procedure of Gellhorn et al., Cancer Research, Supplement No. 3, page 38 (1955), in which treated groups of ten animals each are employed together with untreated extracts. Dosage is 0.5 cc. daily to all cases. Therapy is initiated one day after transplantation of the tumor and is continued for 12 days. At the conclusion of the experiment the animals are weighed and sacrificed, and the tumors are excised and weighed. The compounds of the present invention are found to possess remarkably high potency for inhibiting growth of the tumors at tolerated dosages. Furthermore, even where the tumor is permitted to become established by delaying the initiation of treatment for 6 days, retardation of growth is achieved. In addition to intraperitoneal administration, treatment by the oral route is also effective.

They also exhibit activity against Crocker Sarcoma 180 in mice. According to the procedure described by Clarke, Cancer Research, Supplement No. 3, pages 14–17 (1955), the substance under test is dissolved in sterile 0.85% aqueous saline. Small, uniformly cut pieces of seven-day-old tumor S–180 are implanted subcutaneously in the axillary region of Swiss white mice weighing 18 to 22 g. Each animal receives an implant, and the animals are divided into groups of six each. Intraperitoneal administration of the solution under test in doses of 0.5 cc. twice daily is begun 24 hours after implantation of the tumor and continued for a total of 13 injections. One animal from each group is maintained as a control and receives injections of 0.85% saline. On the 8th day after tumor implantation the surviving animals are weighed to provide a measure of the toxic effect of the drug. The animals are then sacrificed and the tumors are excised and weighed. The tumor weights for each group are averaged and the averages for the treated animals are expressed as percentages of the averages for the control groups. In this test it is found that the compounds of the present invention retard tumor growth to a marked degree at tolerable dosage levels.

Like many carcinostatic agents, these pyrazole derivatives are somewhat toxic. However, therapeutic doses can be administered without substantial adverse effect. It has generally been agreed that survival rates of 7/10 in the CA–755 test, 4/6 in the S–180 test and 5/8 in the HS–1 test represent the minimum acceptable. In the present instance, these criteria are met or exceeded at dosage levels as high as 160 mg. per kg. of body weight with marked retardation of tumor growth.

Replacement of the carboxamido group by the thiocarboxamido group brings about a marked increase in cytotoxicity with no change in physiotoxicity. Pyrazole-1-thiocarboxamide, for example, has at least forty times the activity of pyrazole-1-carboxamide in tissue culture studies.

Replacement of the carboxamide group by the hydroxymethyl group has now been found to effect a surprising increase in tissue culture activity. 1-hydroxymethyl-pyrazole has been found to exhibit tissue culture activity approximately equal to that of pyrazole-1-thiocarboxamide. This valuable pyrazole derivative has the advantage over the remaining pyrazole derivatives discussed herein of sufficient water solubility to permit its administration intravenously in aqueous solution without the addition of other solvents. The cytotoxic endpoints (the concentration which effects a 50% or greater removal of cells) and the lethal endpoints (the concentration at which, after removal by washing in fresh media, growth no longer occurs) determined as described, by Toplin, Cancer Research, 19, 959 (1959), of some of these valuable compounds are given below:

| Compound | Cytotoxic Endpoint | Lethal Endpoint |
|---|---|---|
| Pyrazole-1-carboxamide | 200 | 200 γ/ml. |
| Pyrazole-1-thiocarboxamide | 0.7 to 0.2 | 6–9 γ/ml. |
| Pyrazole | 125 | 200 γ/ml. |
| 1-hydroxymethylpyrazole | 8 | 20 γ/ml. |

The pyrazole derivatives corresponding to Formula I are somewhat more active than are the corresponding 3,5-dimethyl substituted pyrazoles having Formula II. However, all are effective against CA–755, HS No. 1 and S–180 by either the oral or parenteral route.

Their greatest activity is demonstrated against CA–755. Dose response curve data employing dosage levels of pyrazole-1-carboxamide ranging from 20 to 160 mg./kg. indicate that tumor inhibition reaches a plateau at dose levels between 80 to 100 mg./kg./day although 99% tumor inhibition is obtained at higher dose levels, along with some toxicity. Oral administration produces tumor inhibition of up to 96%, indicating that it is absorbed quite readily. As expected, and demonstrated by the appended examples, a larger quantity of the compound is required to produce the same order of activity when the time interval between treatments is increased.

Doses of as high as 800 mg./kg. have proven effective in inhibiting the growth of CA–755. However, in order to minimize toxic effects, the administration of doses of this magnitude, and preferably of all doses greater than about 100 mg./kg./day, should be spaced at intervals such that the daily dose when averaged over this interval does not exceed about 100 mg./kg./day.

Pyrazole-1-carboxamide appears to be much more toxic when given BID (twice a day) than when given at less frequent intervals although it retains its effectiveness over a range of treatment schedules. Large single doses given on the first day after tumor implantation retain their activity over the usual test period for CA–755, although better results are obtained when the large single dose is given on the sixth day following tumor implantation.

Pyrazole-1-carboxamide exhibits a constant but moderate activity against the human tumor HS–1 grown in the conditioned rat. Its activity appears to be independent of the route of administration. Moreover, it is active against the freshly implanted and established tumor.

It exhibits unusual activity against spontaneous mammary tumor in the $C_3H$ mouse (a highly inbred strain of mouse having a high evidence of spontaneous mammary tumor and obtained from Bar Harbor, Maine). This is unexpected since so few compounds have any effect at all on this tumor. The tests were conducted with breeding females bearing tumors. The mice were marked, the tumors calibrated over a period of at least 7 days and then placed into groups as uniform as possible with respect to tumor size or tumor growth rate. Animals having rapidly or slowly growing tumors and pregnant females were not used. The compound, dissolved in distilled water, or suspended in carboxymethylcellulose at the higher concentration used, was administered daily to the mice as long as the animals survived. It was found that the control tumors increased steadily in average tumor diameter and average tumor volume, a 75% increase in average tumor volume occurring between the 6 and 17 day period of the test. The administration of pyrazole-1-carboxamide at 200 mg./kg./day intraperitoneally or at 175 mg./kg./day orally markedly arrested the tumor growth. During the same period the average tumor volume of the intraperitoneally treated group increased only 10% while that of the orally treated group decreased 16% in tumor volume.

Various pharmaceutical preparations can be advantageously compounded which contain the active substance along with liquid or solid diluents. Solid preparations for extemporaneous dilution may be formulated employing various buffering agents as well as local anesthetics and other medicinal agents such as antibiotics, hypnotics, analgesics, etc., and inorganic salts to afford desirable pharmacological properties to the composition. Since this active substance is stable and widely compatible, it may be administered in solution or suspension in a variety of pharmacologically acceptable vehicles, including water, propylene glycol, diethylcarbonate, glycerol, or oils such as peanut oil or sesame oil.

For oral administration they can be conveniently packed in gelatin capsules, compressed into tablets with sodium chloride, or admixed with, for instance, lactose, potato starch and magnesium stearate and then made into tablets. Alternatively, they can be made into solutions or suspensions in isotonic saline, aqueous glucose or propylene glycol containing from about 10 mg./ml. to about 400 mg./ml. of the drug. Such liquid compositions are convenient and effective via both oral and parenteral administration.

Daily doses of the order of 40 to 120 mg./kg. of the compounds of the present invention are highly effective in inhibiting tumors in lower animals. Therefore, the concentration of the active ingredient in the carrier will usually be at least about 0.1% by weight.

In addition, these valuable active substances may be employed in combination with one or more other carcinostatic agents. For this purpose, compositions containing from 10 to 90% of the compounds of the present invention are useful. Known carcinostatic agents which may be employed in such combinations include the nitrogen mustard type carcinostats, 6-mercaptopurine, 8-azaguanine, urethane, 6-diazo-5-oxo-$l$-norleucine, azaserine, triethylenemelamine, mitomycin C, triethylenephosphoramide, 1,4-dimethylsulfonyloxybutane, the carcinostatic folic acid analogs and the like.

The following examples are provided by way of illustration, and are not intended to limit this invention, the scope of which is indicated by the appended claims.

EXAMPLE I

Some pyrazole compounds are tested for effectiveness in inhibiting the growth of mammary adenocarcinoma CA–755 according to the procedure of Gellhorn et al. (loc. cit.). Administration is by the intraperitoneal (I.P.) route in each case at the rate of 1 treatment per day for a total of 11 days. Results are tabulated in Table I.

Table I

| Compound | Dosage, mg./kg. | Survival Rate | Percent Inhibition |
|---|---|---|---|
| Pyrazole-1-carboxamide | 80 | 10/10 | 96 |
| Do | 80 | 8/10 | 89 |
| Do | 80 | 9/10 | 92 |
| Do | 60 | 10/10 | 89 |
| Do | 90 | 10/10 | 97 |
| Do | 80 | 9/10 | 80 |
| Pyrazole-1-thiocarboxamide | 80 | 9/10 | 80 |
| Do | 160 | 1/10 | 96 |
| 3,5-dimethyl-pyrazole-1-carboxamide | 80 | 9/10 | 51 |
|  | 160 | 9/10 | 65 |
| Pyrazole | 80 | 9/10 | 65 |
| 1-hydroxymethylpyrazole | 80 | 9/10 | 97 |
| Do | 80 | 9/10 | 97 |

EXAMPLE II

The experiment of Example I is repeated using pyrazole-1-carboxamide with results as given in Table II.

Table II

| Dosage, mg./kg. | Survival Rate | Percent Inhibition |
|---|---|---|
| 20 | 9/10 | 19 |
| 40 | 10/10 | 48 |
| 80 | 10/10 | 93 |
| 100 | 10/10 | 96 |
| 120 | 7/10 | 99 |
| 140 | 7/10 | 98 |
| 160 | 6/10 | 99 |

EXAMPLE III

The experiment of Example II is repeated, the drug being administered by the oral rather than the intraperitoneal route. Results are recorded in Table III.

Table III

| Dosage, mg./kg. | Survival Rate | Percent Inhibition |
|---|---|---|
| 80 | 10/10 | 91 |
| 120 | 10/10 | 96 |
| 160 | 10/10 | 96 |
| 240 | 1/10 | 97 |

EXAMPLE IV

Pyrazole-1-carboxamide is evaluated for its effectiveness in inhibiting the growth of human tumor HS–1 cultivated in rats by the procedure of Marsh and Cullen, N.Y. Acad. Sci. 76, 752 (1958). Results are given in Table IV.

Table IV

| Dosage, mg./kg. | Survival Rate | Percent Inhibition |
|---|---|---|
| 80 | 6/8 | 42 |
| 120 | 7/8 | 42 |

EXAMPLE V

The pyrazole compounds are evaluated for their effectiveness in treating Sarcoma-180 following the procedure of Clarke (loc. cit.) with the results reported in Table V.

*Table V*

| Compound | Dosage, mg./kg. | Survival Rate | Percent Inhibition |
|---|---|---|---|
| Pyrazole-1-carboxamide | 100 | 6/6 | 42 |
| Do | 120 | 6/6 | 45 |
| Do | 140 | 6/6 | 51 |
| Do | 160 | 6/6 | 60 |
| Pyrazole-1-thiocarboxamide | 80 | 5/6 | 38 |
|  | 100 | 4/6 | 39 |
|  | 120 | 4/6 | 55 |
| 3,5-dimethylpyrazole-1-carboxamide | 240 | 6/6 | 28 |
|  | 320 | 6/6 | 43 |
| Pyrazole | 80 | 6/6 | 30 |
| 1-hydroxymethylpyrazole | 50 | 6/6 | 41 |

EXAMPLE VI

The procedure of Example I is repeated using pyrazole-1-carboxamide, the drug being administered at various intervals rather than on a daily schedule. Pertinent data are tabulated in Table VI.

*Table VI*

| Dosage, mg./kg. | No. of Treatments, Schedule* | Survival Rate | Percent Inhibition |
|---|---|---|---|
| 80 | 6 EOD | 10/10 | 55 |
| 120 | 6 EOD | 10/10 | 83 |
| 160 | 6 EOD | 10/10 | 96 |
| 200 | 6 EOD | 9/10 | 96 |
| 80 | 4 E3D | 10/10 | 16 |
| 120 | 4 E3D | 10/10 | 40 |
| 160 | 4 E3D | 10/10 | 78 |
| 200 | 4 E3D | 10/10 | 84 |
| 80 | 3 E4D | 9/10 | 15 |
| 128 | 3 E4D | 10/10 | 28 |
| 160 | 3 E4D | 10/10 | 65 |
| 200 | 3 E4D | 10/10 | 68 |

*EOD=every other day. E3D=every third day. E4D=every fourth day.

EXAMPLE VII

The experiment of Example I is repeated with pyrazole-1-carboxamide, the drug being administered in large single doses on the first day after tumor implantation. The results given in Table VII-A demonstrate that large single doses given on day one retain their activity over the usual test period for CA-755.

*Table VII-A*

| Dosage, mg./kg. | Route | Survival Rate | Percent Inhibition |
|---|---|---|---|
| 300 | I.P. | 8/10 | 45 |
| 400 | I.P. | 10/10 | 55 |
| 600 | I.P. | 8/10 | 61 |
| 800 | I.P. | 10/10 | 59 |
| 300 | Oral | 10/10 | 37 |
| 400 | Oral | 7/10 | 28 |
| 600 | Oral | 7/10 | 84 |
| 800 | Oral | 4/10 | 94 |

The single dose treatment, however, produces better results when the single large dose of pyrazole-1-carboxamide is given on day 6 following implantation of the tumor as shown in Table VII-B.

*Table VII-B*

| Dosage, mg./kg. | Route | Survival Rate | Percent Inhibition |
|---|---|---|---|
| 300 | I.P. | 10/10 | 50 |
| 400 | I.P. | 10/10 | 52 |
| 600 | I.P. | 10/10 | 90 |
| 800 | I.P. | 8/10 | 92 |
| 300 | Oral | 10/10 | 59 |
| 400 | Oral | 9/10 | 65 |
| 600 | Oral | 9/10 | 81 |
| 800 | Oral | 8/10 | 92 |

EXAMPLE VIII

Pyrazole-1-carboxamide is tested for effectiveness in inhibiting the growth of human tumor HS-1 grown in rats according to the procedure of Marsh and Cullen (loc. cit.).

The route of administration, dosage and other pertinent data are recorded in Table VIII. The dosage levels are presented in two ways: as initial daily dose level and total dose administered since in the treatment of this tumor it is sometimes necessary to reduce the dose or to discontinue treatments for a day or two when toxicity becomes evident.

*Table VIII*

THE EFFECT OF PYRAZOLE-1-CARBOXAMIDE ON HS-1

| Unit Dose, mg./kg. | Total Dose, mg./kg. | No. of cc. Given | Method | Survival Rate | Percent Inhibition |
|---|---|---|---|---|---|
| 120 | 600 | 5 at 0.5 cc. 1×/day | I.P. | 7/8 | 42 |
| 100 | 600 | 6 at 0.5 cc. 1×/day | I.P. | 8/8 | 40 |
| 100 | 600 | 6 at 0.5 cc. 1×/day | Oral | 8/8 | 22 |
| 150 | 750 | 5 at 0.5 cc. 1×/day | Oral | 7/8 | 53 |
| 80 | 480 | 6 at 0.5 cc. 1×/day | I.P. | 8/8 | 45 |
| 100 | 550 | 5½ at 0.5 cc. 1×/day | I.P. | 8/8 | 59 |
| 120 | 720 | 6 at 0.5 cc. 1×/day | I.P. | 8/8 | 36 |
| 20 | 245 | 12¼ at 0.5 cc. BID | I.P. | 8/8 | 17 |
| 40 | 490 | 12¼ at 0.5 cc. BID | I.P. | 8/8 | 27 |
| 120 | 360 | 3 at 0.5 cc. EOD | I.P. | 8/8 | 38 |
| 140 | 420 | 3 at 0.5 cc. EOD | I.P. | 8/8 | 26 |
| 160 | 480 | 3 at 0.5 cc. EOD | I.P. | 8/8 | 28 |
| 200 | 400 | 2 at 0.5 cc. E3D | I.P. | 8/8 | 17 |
| 100 | 550 | 5½ at 0.5 cc. 1×/day | I.P. | 7/8 | 53 |
| 100 | 200 | 1.2 at 0.1 cc. 1×/day | S.C. | 8/8 | 31 |
| 100 | 200 | 1.2 at 0.1 cc. 1×/day | I.M. | 8/8 | 49 |
| 100 | 600 | 6 at 0.5 cc. 1×/day | Oral | 8/8 | 36 |
| 150 | 712.5 | 4¾ at 0.5 cc. 1×/day | Oral | 8/8 | 65 |
| 200 | 800 | 4 at 0.5 cc. 1×/day | Oral | 7/8 | 64 |
| 100 | 350 | 3½ at 0.5 cc. 1×/day from day 6. | I.P. | 8/8 | 24 |
| 120 | 420 | 3½ at 0.5 cc. 1×/day from day 6. | I.P. | 7/8 | 50 |
| 150 | 525 | 3½ at 0.5 cc. 1×/day from day 6. | Oral | 8/8 | 49 |

EXAMPLE IX

A 0.1% solution of each of the following compounds is prepared using isotonic saline as the vehicle:

1-hydroxymethylpyrazole
Pyrazole-1-carboxamide
Pyrazole-1-thiocarboxamide

Pyrazole
3,5-dimethylpyrazole-1-carboxamide
3,5-dimethylpyrazole-1-thiocarbamide These solutions are satisfactory for parenteral administration in retarding the growth of malignant tumors.

EXAMPLE X 50 grams of pyrazole-1-carboxamide are ground thoroughly with 50 grams of lactose and the resulting mixture packed into gelatin capsules, each capsule containing 1.0 gram of the mixture. This composition is satisfactory for oral administration in retarding the growth of malignant tumors.

Similar compositions are prepared with pyrazole-1-thiocarboxamide, 1-hydroxymethylpyrazole, 3,5-dimethylpyrazole-1-carboxamide, 3,5-dimethylpyrazole-1-thiocarboxamide and pyrazole. Such capsules can be administered to the tumor bearing host at the rate of, for example, two capsules 4 times a day or at less frequent intervals as the condition dictates.

EXAMPLE XI

Suspensions suitable for parenteral administration are prepared using the following quantities of pyrazole-1-thiocarboxamide, and propylene glycol.

| Pyrazole-1-thio-carboxamide, g. | Propylene-glycol, ml. |
|---|---|
| 10 | 1,000 |
| 50 | 1,000 |
| 100 | 1,000 |
| 200 | 1,000 |
| 400 | 1,000 |

EXAMPLE XII

*Pyrazole-1-thiocarboxamide*

To a well stirred solution of 1,1,3-trimethoxy-3-ethoxypropane (178.2 g., 1 mole) in methanol (300 ml.) there is added dropwise, over a 30 minute period, a solution of thiosemicarbazide (91.1 g., 1 mole) in water (500 ml.) and concentrated hydrochloric acid (83.3 ml.). The reaction is slightly exothermic and, during addition, the reaction mixture become a golden yellow color. Toward the end of the addition crystals appear.

The reaction mixture is stirred for 3 hours following addition, then cooled and filtered. The yellow crystalline product is washed with ice-water and dried in vacuo over phosphorous pentoxide. Removal of the alcohol from the filtrate permits recovery of a second crop of crystals.

For purification, the combined products are dissolved in hot acetone (500 ml.), filtered and the pure product precipitated by the addition of 800 ml. of water.

In like manner, but using acetylacetone as reactant in place of the 1,1,3-trimethoxy-3-ethoxypropane, 3,5-dimethylpyrazole-1-thiocarboxamide is prepared. These products demonstrate unexpectedly high activity in tissue culture studies and are markedly more cytotoxic than are the analogous carboxamido compounds.

This application is a continuation-in-part of my copending United States application, Serial No. 15,047, filed March 15, 1960, and of United States application, Serial No. 836,079, filed August 26, 1959, both now abandoned.

What is claimed is:

A process for retarding the growth of malignant tumors which comprises administering to a malignant tumor bearing lower animal host a daily dose of from about 40 to about 120 mg./kg. of body weight of a compound selected from the group consisting of pyrazole-1-carboxamide, pyrazole-1-thiocarboxamide, pyrazole, 1-hydroxymethylpyrazole, 3,5-dimethylpyrazole-1-carboxamide and 3,5-dimethylpyrazole-1-thiocarboxamide.

References Cited in the file of this patent

Owen: J. A. Ph. A., Sci. ed., 47 (1), January 1958, pp. 70–72.

Chemical Abstracts, vol. 46, 1952, p. 7035c.

Chemical Abstracts, vol. 51, 1957, pp. 1152c and 9593g.

Dyer: Index of Tumor Chemotherapy, pub. by Fed. Soc. Agency, Publ. Health Service, 1951, p. 95.

Shepard: J. Bact., vol. 73, 1957, pp. 494–498.